(12) United States Patent
Beierl et al.

(10) Patent No.: US 12,145,660 B2
(45) Date of Patent: Nov. 19, 2024

(54) AIR CONDUCTION DEVICE FOR A MOTOR VEHICLE

(71) Applicant: Dr. Ing. h.c. F. Porsche Aktiengesellschaft, Stuttgart (DE)

(72) Inventors: Dominik Beierl, Korntal-Münchingen (DE); Joachim Paul, Benningen a.N. (DE); Henrik Heidorn, Renningen (DE); Haiko Neher, Sachsenheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 280 days.

(21) Appl. No.: 17/860,361

(22) Filed: Jul. 8, 2022

(65) Prior Publication Data
US 2023/0016708 A1  Jan. 19, 2023

(30) Foreign Application Priority Data
Jul. 12, 2021  (DE) ...................... 10 2021 117 866.5

(51) Int. Cl.
| | |
|---|---|
| *B62D 35/00* | (2006.01) |
| *B62D 35/02* | (2006.01) |
| *B62D 37/02* | (2006.01) |

(52) U.S. Cl.
CPC ........... *B62D 35/02* (2013.01); *B62D 35/007* (2013.01); *B62D 35/008* (2013.01); *B62D 37/02* (2013.01)

(58) Field of Classification Search
CPC ..... B62D 35/007; B62D 35/008; B62D 37/02
See application file for complete search history.

(56) References Cited

U.S. PATENT DOCUMENTS

| | | | |
|---|---|---|---|
| 9,327,775 B1 * | 5/2016 | Guenzel ............... | B62D 35/008 |
| 11,827,284 B2 * | 11/2023 | Beierl .................... | B62D 37/02 |
| 11,834,106 B2 * | 12/2023 | Beierl .................. | B62D 35/007 |

(Continued)

FOREIGN PATENT DOCUMENTS

| | | |
|---|---|---|
| DE | 3613301 A1 | 10/1987 |
| DE | 8807266 U1 | 10/1988 |

(Continued)

OTHER PUBLICATIONS

German Examination Report for German Application No. 10 2021 117 866.5, dated Mar. 22, 2024 with English translation, 6 pages.

*Primary Examiner* — Gregory A Blankenship
(74) *Attorney, Agent, or Firm* — Buchanan Ingersoll & Rooney PC

(57) ABSTRACT

An air conduction device for a motor vehicle includes an air conduction element and a movement device. The air conduction element is movably configured relative to the remaining body as at least part of a tail side part of a body of the vehicle. The air conduction element can be brought into an inoperative position and at least one final operating position. The tail side part has a flow guiding area along which air flows which is designed to face an area surrounding the motor vehicle. The air conduction element has a surface which is at least part of the flow guiding area. The air conduction element is configured in its final operating position to lengthen the flow guiding area in the direction of a longitudinal body axis (X) of the body. The air conduction element can be brought into its positions with the help of the movement device.

15 Claims, 2 Drawing Sheets

(56) References Cited

U.S. PATENT DOCUMENTS

Figure 1:
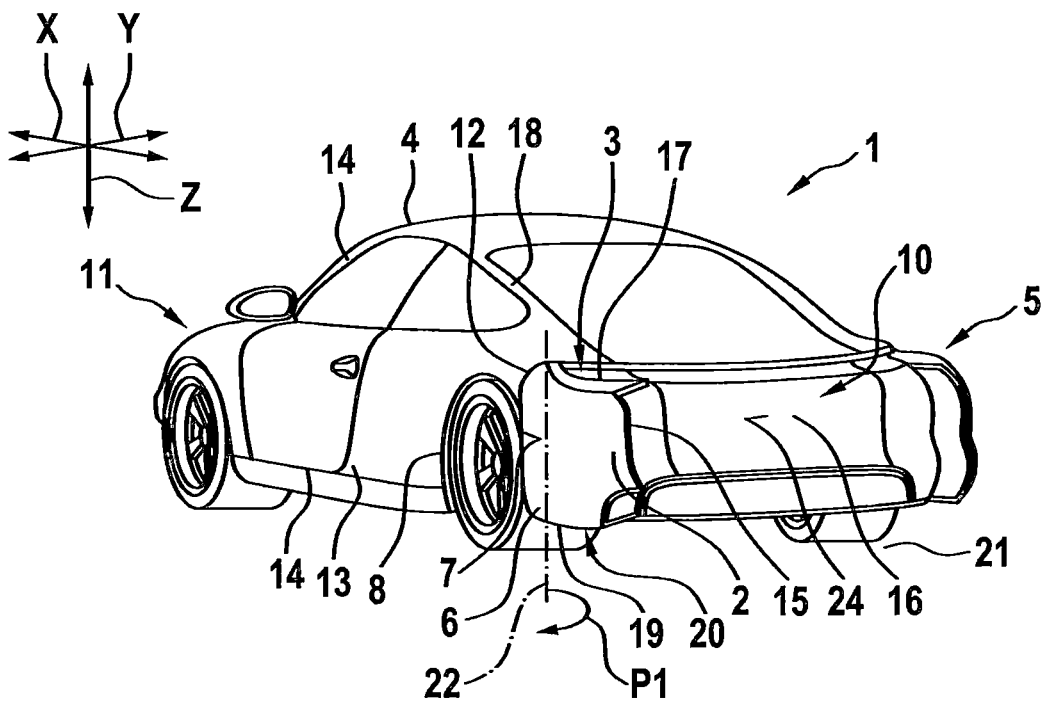

| | | | | |
|---|---|---|---|---|
| 2004/0130182 A1* | 7/2004 | Bangle | .................... | D06N 3/14 |
| | | | | 296/180.5 |
| 2011/0198885 A1 | 8/2011 | Ilse et al. | | |
| 2013/0076064 A1* | 3/2013 | Smith | .................. | B62D 35/007 |
| | | | | 296/180.1 |
| 2018/0111649 A1* | 4/2018 | Gandhi | .................. | B62D 37/02 |
| 2019/0329698 A1* | 10/2019 | Leonard | ................ | B60Q 1/0483 |
| 2020/0001935 A1* | 1/2020 | Nielsen | ................ | B62D 35/007 |
| 2020/0369331 A1* | 11/2020 | Ferri | .................... | B62D 35/008 |
| 2021/0229758 A1* | 7/2021 | Göbel | .................... | B62D 37/02 |
| 2023/0016708 A1* | 1/2023 | Beierl | .................... | B62D 37/02 |
| 2023/0057190 A1* | 2/2023 | Paul | ........................ | B62D 37/02 |
| 2023/0202587 A1* | 6/2023 | Nakamura | ............ | B62D 35/007 |
| | | | | 296/180.5 |
| 2024/0010283 A1* | 1/2024 | Salkic | .................... | B60R 13/04 |

FOREIGN PATENT DOCUMENTS

| | | |
|---|---|---|
| DE | 10012905 A1 | 9/2001 |
| DE | 102009034517 A1 | 1/2011 |
| DE | 102010008332 A1 | 8/2011 |
| DE | 102015121785 A1 | 6/2016 |
| DE | 102019103053 A1 | 8/2020 |
| EP | 3854664 A1 | 7/2021 |
| FR | 3054994 A1 | 2/2018 |
| WO | 2015052406 A1 | 4/2015 |

* cited by examiner

AIR CONDUCTION DEVICE FOR A MOTOR VEHICLE

CROSS-REFERENCE TO RELATED APPLICATION

This application claims priority to German Patent Application No. 10 2021 117 866.5, filed Jul. 12, 2021, the content of such application being incorporated by reference herein in its entirety.

FIELD OF THE INVENTION

The invention relates to an air conduction device for a motor vehicle.

BACKGROUND OF THE INVENTION

Air conduction devices for improving stability of the motor vehicle and for reducing fuel consumption due to a reduction in flow losses, in particular in a medium to upper speed range of the motor vehicle, are known in the art. Spoilers, in particular, are used for this purpose and are arranged in a tail region of a motor vehicle body of the motor vehicle and extend along a lateral axis of the motor vehicle.

A further option for reducing flow losses is that of influencing an air flow forming along a side face of the body in a tail region of the motor vehicle body when the motor vehicle is running.

A side panel of a motor vehicle body, which covers at least a sill region of said motor vehicle body and which can be retracted and extended with the help of adjusting elements depending on the driving speed, is known from the first publication of the patent application DE 36 13 301 A1, which is incorporated by reference herein.

A motor vehicle with a fin-like air conduction element arranged in the tail region can be inferred from the first publication of the patent application DE 2010 008 332 A1, which is incorporated by reference herein, which air conduction element is adjustable in a translatory manner between a retracted and an extended position. In the retracted position, it is completely inserted in a slot of a body of the motor vehicle.

The first publication of the patent application DE 10 2009 034 517 A1, which is incorporated by reference herein discloses a motor vehicle with an air conduction device arranged in the tail region or in the front region, wherein the air conduction device is arranged in the region of a bumper for additional protection against tailgaters, and is itself elastically deformable or is held on a motor vehicle body in an elastically deformable manner.

SUMMARY OF THE INVENTION

In the interests of improving air conduction device for a motor vehicle, an air conduction device of a motor vehicle according to aspects of the invention has an air conduction element and a movement device. The air conduction element is movably configured relative to the remaining body as at least part of a tail side part of a body of the motor vehicle and is arranged such that it can be brought into at least one final operating position which differs from the inoperative position. The tail side part has a flow guiding area along which air flows which is designed to face an area surrounding the motor vehicle. The air conduction element has a surface which is at least part of the flow guiding area, and wherein the air conduction element is configured in its final operating position to lengthen the flow guiding area in the direction of a longitudinal body axis of the body. The air conduction element can be brought into its positions in a defined manner with the help of the movement device. In accordance with the invention, the surface of the air conduction element in the inoperative position is arranged spaced apart in the direction of the area surrounding an outer surface of the remaining adjacent body forming a gap. The advantage of the invention can be seen in that a total form of the body which has reduced resistance in the final operating position of the air conduction element, and is therefore flow-optimized, can be achieved, wherein a flush arrangement of the air conduction element with the remaining body is not formed, which would lead to possible embodiments of the air conduction element being restricted and therefore to possible, in particular, reduced-air resistance, embodiments or styling-optimized embodiments of the body being restricted.

In order to avoid air from flowing behind the air conduction element, at least in the inoperative position, a cover element is arranged in the gap between the remaining body and the air conduction element. This leads to a further reduction in air resistance. In the extended state, the cover element preferably prevents air from flowing behind, which can also be referred to as underflow. In the inoperative position, the cover element could also be invisible or possibly moved backwards separately.

Insofar as the cover element is fixedly connected to the air conduction element, a movement, and therefore a positioning, of the cover element takes place immediately with a movement of the air conduction element, so that particularly from the final operating position into the inoperative position, the gap is simultaneously closed when the inoperative position of the air conduction element is reached.

The cover element has a first abutting edge which is formed facing a front of the body, wherein, to put it differently, this first abutting edge is the abutting edge of the air conduction element first encountered by the air flow. A positioning of the cover element directly on this first abutting edge leads to the avoidance of an undercut between the air conduction element and the cover element at which turbulence could be created, which can lead to an increase in the air resistance coefficient.

In order to further reduce air resistance, a further cover element is arranged in a hole formed between the further body and the air conduction element in the final operating position.

The cover element is movably formed separately or coupled with the movement device. During a movement of the cover element independently of the movement device, in other words separately, an individual movement of the cover element can be carried out. A coupled movement with the movement device ensures the movement of the cover element with the air conduction element.

In order to further reduce air resistance, the air conduction element has a cut-off edge, so that the air flow can be cut off in a defined manner after flowing over said air conduction element. The cut-off edge is advantageously formed perpendicularly to the flow direction.

A design of the surface of the air conduction element which deviates from a contour of the remaining body leads to free formability of the surface, in order to bring about a further reduction in air resistance.

The movement device is advantageously designed in the form of a multi-joint mechanism, so that a secured movement of the air conduction element can be achieved.

BRIEF DESCRIPTION OF THE DRAWING FIGURES

Figure 2:
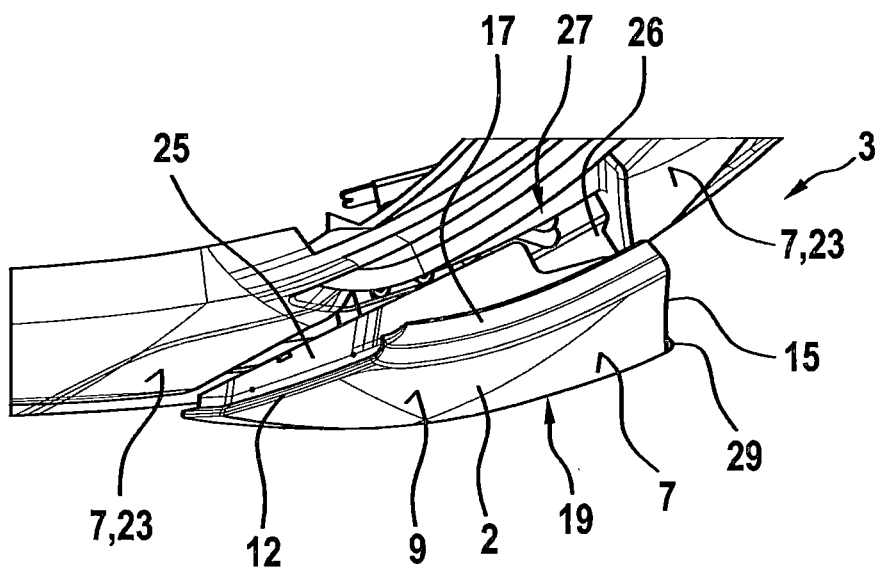
Figure 3:
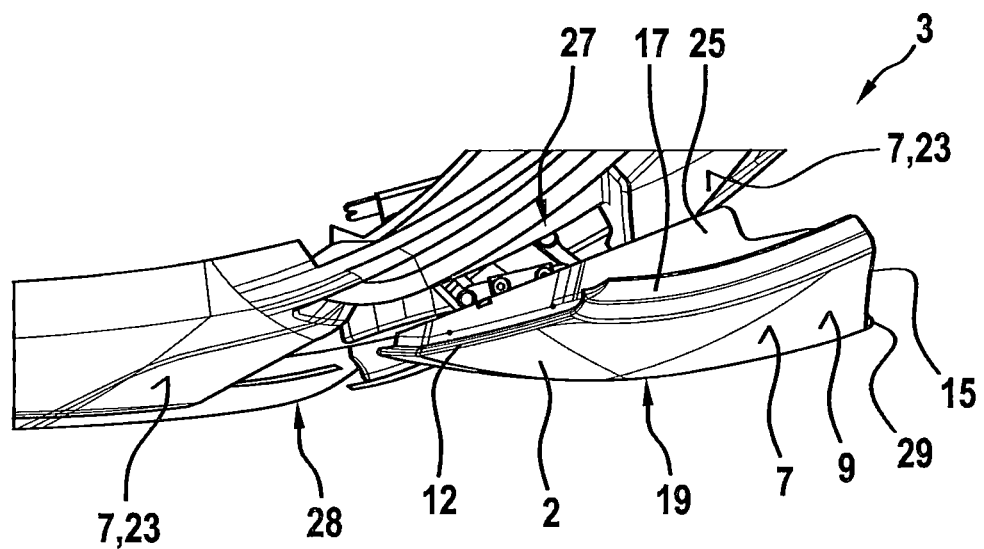

Further advantages, features and details of the invention result from the following description of preferred exemplary embodiments, and also with the help of the drawing. The features and combinations of features referred to above in the description, and also the features and combinations of features referred to below in the figure description and/or in the figures alone, can not only be used in the combination specified in each case, but also in other combinations or in isolation, without departing from the framework of the invention. Identical or functionally identical elements are assigned identical reference signs. In the drawing:

FIG. 1 shows a perspective view of a motor vehicle with an air conduction device according to aspects of the invention in its final operating position, FIG. 2 shows a perspective plan view of a detail from the motor vehicle with the air conduction device according to aspects of the invention in its inoperative position, and FIG. 3 shows a perspective plan view of a detail from a motor vehicle with the air conduction device in accordance with the invention in its final operating position,

DETAILED DESCRIPTION OF THE INVENTION

FIG. 1 shows a perspective view of a motor vehicle 1 with an air conduction device 3 in accordance with the invention depicted in a final operating position. The air conduction device 3 comprises an air conduction element 2 and a movement device 27 for positioning the air conduction element 2, wherein details of the air conduction device 3 are depicted in FIGS. 2 and 3.

A body 4 of the motor vehicle 1 has a tail end 5 which preferably has a rounded design. The air conduction element 2, and its primary action to guide the air flow is, however, dependent on a shape of the tail end 5. The air conduction element 2 forms part of the body 4, but it is movable.

The air conduction element 2 is provided to reduce turbulence in the air flow which can bring about an increase in the air resistance coefficient. For this purpose, the air conduction element 2 is movably configured relative to the remaining body 4, therefore the portion of the body 4 without the air conduction element 2, as at least part of a tail side part 6, or as the tail side part 6 itself. The tail side part 6 has a flow guiding area 7 designed to face the surrounding area, along which flow guiding area air flows, and which flow guiding area conducts said air.

The air conduction element 2 is, in particular in its final operating position, designed to extend the flow guiding area 7 in the direction of a longitudinal extent, so in particular in the direction of a longitudinal body axis X of the body 4. This means, in other words, that the air conduction element 2 naturally extends, in addition to its extent in the direction of the longitudinal body axis X, also in the direction of a transverse body axis Y and a vertical body axis Z, as a result of which it also has a flow guidance in the direction of the transverse body axis Y and the vertical body axis Z, however its function is primarily an extension of the flow guiding area 7 for flow guidance along the longitudinal body axis X. Or, to put it differently, the air conduction element 2 is particularly configured in its final operating position to extend the flow guiding area 7 in the direction of a tail end surface 24 of the body 4 along a longitudinal body axis X of the body 4. The tail end surface 24 could also project.

The tail side part 6 is designed to exhibit at least in part a wheel arch 8 and, depending on the design of the body 4, it may have at least in part a tail light opening not shown in greater detail, and it may have at least in part a bumper 10, and it is furthermore configured adjacent on its first abutting edge 12 formed facing a front 11 of the body 4, which side part in the present exemplary embodiment has at least in part a door frame 14. On its second abutting edge 15 facing away from the first abutting edge 12, it is configured to be adjacent to a tail center part 16, wherein the tail center part 16, starting from the front 11, has an extent of the body 4 which is greatest in the direction of the longitudinal body axis X. Or, to put it differently, the tail center part 16, viewed from the front 11, represents a rear end of the body 4. The tail center part 16 is configured in a manner extending predominantly in the direction of the transverse body axis Y.

In the direction of the vertical body axis Z, the tail side part 6 is configured with its third abutting edge 17 adjacent to a C-pillar structure 18 of the body 4. A fourth abutting edge 19 of the tail side part 6 is designed facing away from the third abutting edge 17, which abutting edge encompasses the part of the wheel arch 8 and an end edge 20 of the tail side part 6 in relation to a driving surface 21.

At this point, it should be mentioned that the abutting edges 12, 15, 17, 19 of the tail side part 6 need not necessarily be configured to be adjacent to the components of the body 4 referred to above, but instead, these components should only be used for a spatial orientation of the abutting edges 12, 15, 17, 19 to describe the air conduction device 3 according to aspects of the invention In order to position the air conduction element 2 from its inoperative position into its final operating position, at least one pivoting movement about a pivot axis 22 can be executed, wherein the pivot axis 22 extends in the direction, or predominantly in the direction, of the vertical axis of the body Z. This means, in other words, that the air conduction element 2 is arranged on the body 4 so as to be pivotable about the pivot axis 22, from its inoperative position into a first operating position, which has to be adopted before its final operating position is reached.

Insofar as the pivot axis 22 does not extend precisely in the direction of the vertical body axis Z, it may be configured to form an acute angle with the vertical body axis Z in a manner not depicted in greater detail. Furthermore, and likewise not depicted in greater detail, it may also be designed, depending on its arrangement with the transverse body axis Y, to form a further acute angle and/or to form an additional acute angle with the longitudinal body axis X. Of course the angles are each designed starting from an intersection of the axes X, Y, Z between the axial portions extending in the same direction. This means, in other words, that the pivot axis 22 need not necessarily be precisely configured in respect of the vertical body axis Z, but it may also be arranged obliquely thereto. The pivot axis 22 preferably extends along a chord of the tail side part 6, or parallel thereto, or it is itself curved in accordance with a contour of the tail side part 6.

In the exemplary embodiment presented, as depicted in FIG. 1, the air conduction device 3 according to aspects of the invention has the air conduction element 2 in the form of the tail side part 6. This means, in other words, that in order to position the air conduction element 2 in its final operating position, the entire tail side part 6 is pivoted about the pivot axis 22, as is illustrated with the help of the arrow P1. In other words, the tail side part 6 is movably arranged on the body 4 and can be brought into the inoperative position and at least its final operating position.

It should be mentioned at this point that the air conduction element 2, starting from its final operating position, is moved into its inoperative position by a movement in the opposite direction to the movement into its final operating position. Insofar as two or more movement steps are involved in positioning in the final operating position, these are carried out in reverse order in relation to the positioning starting from the inoperative position into the final operating position.

In a further exemplary embodiment not depicted in greater detail, the pivot axis 22 of the air conduction device 3 according to aspects of the invention is arranged transversely to the body axes X, Y, Z, wherein the first abutting edge 12 is pivoted during the positioning of the air conduction element 2 into its final operating position below the adjacent components of the remaining body 4. The second abutting edge 15 and the fourth abutting edge 19 are moved on account of the pivoting about the pivot axis 22 in the opposite direction to the tail center part 16.

In accordance with the invention, a surface 9 of the air conduction element 2 arranged facing the surrounding area is configured spaced apart from an outer surface 23 of the remaining body 4 in the inoperative position of the air conduction element 2 along the transverse body axis Y. This means, in other words, that the surface 9 and the outer surface 23 are not designed flush, as depicted in FIG. 2, in which the air conduction element 2 is illustrated in its inoperative position.

A gap 26 formed between the remaining body 4 and the air conduction element 2 is covered with the help of a cover element 25, so that a flow of air behind the air conduction element 2 which helps to increase an air resistance coefficient of the motor vehicle 1 is prevented. The cover element 25 is preferably configured to close the gap 26 virtually completely, or completely. It may be configured as a composite component.

A positioning of the air conduction element 2 in its final operating position, as depicted in FIG. 3, leads to a lengthening of the flow guiding area 7 along the longitudinal body axis X. A hole 28 formed in this position between the remaining body 4 and the first abutting edge 12 can be closed with the help of a protective element not depicted in greater detail. This protective element may be formed from a textile fabric or an elastomer, for example, and therefore flexibly configured. Likewise, it could be formed as a fixed and rigid element which is positioned in the hole 28 with the help of an element mechanism.

The movement device 27 of the air conduction element 2 may be configured in the form of a multi-joint mechanism, wherein the movement device 27 is arranged on the remaining body 4 such that it is supported there. The movement device 27 is actuated with the help of control unit of the motor vehicle which is not represented in greater detail. The movement device 27 could also be configured in the form of a sliding gate. The air conduction element 2 is fixedly connected to the movement device 27.

The positioning of the air conduction element 2 can take place with the help of a pivoting about the pivot axis 22 and a translatory movement along the longitudinal body axis X.

Likewise, depending on a shape of the remaining body 4 and a shape of the air conduction element 2, said air conduction element 2 could also only be positioned through a translatory movement in the direction of the longitudinal body axis X.

The surface 9 of the air conduction element 2 may be formed in an aerodynamically adapted manner. This means, in other words, that an outer contour of the air conduction element 2 need not necessarily be joined into a contour of the remaining body 4. Advantageously, a large extent of the air conduction element 2 along the vertical body axis Z and a large extent along the longitudinal body axis X, so a large flow guiding area 7, can be brought about.

The air conduction element 2 has, in particular on its second abutting edge 15, a cut-off edge 29 formed at right-angles to the flow direction, at which cut-off edge the flow can be cut off in a defined manner. This means that on the surface 9 of the air conduction element 2, an element part arranged extending in the direction of the transverse body axis Y, virtually perpendicularly to the surface 9, is formed, which element part forms the cut-off edge 29. Said element part may be rigidly arranged on the air conduction element 2, or may likewise be movably configured.

The air conduction element 2 may be received resting on the remaining body 4, preferably on the fourth abutting edge 19. Likewise, it can be received at the body 4 in a cantilevered manner, virtually with the help of the movement device 27.

The protective element 25 is formed directly on the abutting edge 12 in an exemplary embodiment not depicted in greater detail, and is arranged in the inoperative position on the remaining body 4 in a virtually adjacent manner. It could have a sealing lip on its edge formed facing the remaining body 4, so that a flow of air behind the air conduction element 2 is reliably avoided. Likewise, damage to the outer surface 23 during a movement of the air conduction element 2 can be avoided with the help of the sealing lip, which is usually formed from an elastic material, in particular an elastomer.

LIST OF REFERENCE SIGNS

1 Motor vehicle
2 Air conduction element
3 Air conduction device
4 Body
5 Tail
6 Tail side part
7 Flow guiding area
8 Wheel arch
9 Surface
10 Bumper
11 Front
12 First abutting edge
13 Side part
14 Door frame
15 Second abutting edge
16 Tail center part
17 Third abutting edge
18 C-pillar structure
19 Fourth abutting edge
20 Closing edge
21 Driving surface
22 Pivot axis
23 Outer surface
24 Tail end surface
25 Cover element
26 Gap
27 Movement device
28 Hole
29 Cut-off edge
P1 Arrow
X Longitudinal body axis
Y Transverse body axis
Z Vertical body axis

What is claimed:

1. An air conduction device for a motor vehicle having a longitudinal body axis (X) following a direction of travel of the motor vehicle, a transverse axis (Y) that is orthogonal to the longitudinal body axis (X), and a vertical axis that is orthogonal to both the longitudinal body axis (X) and the transverse axis (Y), the air conduction device comprising:
   an air conduction element disposed on a body of the vehicle and that is movable relative to a remaining body of the motor vehicle, the air conduction element embodying at least part of a tail side part of the body of the motor vehicle, wherein the air conduction element is configured to move between an inoperative position and at least one final operating position which differs from the inoperative position; and
   a movement device for (i) pivoting the air conduction element about the vertical axis in a direction away from the body of the vehicle as the air conduction element is moved from inoperative position to the at least one final operating position, and (ii) rearwardly translating the air conduction element in a direction toward a rear of the motor vehicle and along the longitudinal body axis (X) of the body as the air conduction element is moved from the inoperative position to the at least one final operating position,
   wherein the tail side part has a flow guiding area along which air flows and which is arranged to face a surrounding area of the motor vehicle,
   wherein the air conduction element has an exterior facing surface which forms at least part of the flow guiding area,
   wherein, in the final operating position, the air conduction element lengthens the flow guiding area in a direction of the longitudinal body axis (X) of the body, and
   wherein, in the inoperative position, the exterior facing surface of the air conduction element is spaced apart from an adjacent portion of the remaining body, thereby forming a gap between the air conduction element and the adjacent portion of the remaining body.

2. The air conduction device as claimed in claim 1, further comprising a cover element arranged in the gap between the remaining body and the air conduction element to limit or prevent air from flowing through the gap at least in the inoperative position.

3. The air conduction device as claimed in claim 2, wherein the cover element is fixedly connected to the air conduction element.

4. The air conduction device as claimed in claim 2, wherein the cover element is directly arranged on a first abutting edge of the air conduction element, and wherein the first abutting edge faces a front of the body.

5. The air conduction device as claimed in claim 2, further comprising a further cover element arranged in a hole disposed between the remaining body and the air conduction element in the final operating position.

6. The air conduction device as claimed in claim 2, wherein the cover element either moves along with the movement device, or moves independently with respect to the movement device.

7. The air conduction device as claimed in claim 1, wherein the air conduction element has a cut-off edge.

8. The air conduction device as claimed in claim 7, wherein the cut-off edge is formed at an angle to the longitudinal body axis (X).

9. The air conduction device as claimed in claim 1, wherein the exterior facing surface of the air conduction element deviates from a contour of the remaining body.

10. The air conduction device as claimed in claim 1, wherein the movement device is a multi-joint mechanism.

11. A motor vehicle comprising the air conduction device as claimed in claim 1.

12. The air conduction device as claimed in claim 1, wherein the air conduction element forms at least a part of a rear bumper of the motor vehicle.

13. The air conduction device as claimed in claim 1, wherein the air conduction element forms at least a part of a wheel arch of the motor vehicle.

14. The air conduction device as claimed in claim 1, wherein the air conduction element includes an opening for receiving a taillight of the motor vehicle.

15. The air conduction device as claimed in claim 1, wherein the air conduction element includes a leading edge and a trailing edge that is oriented further along the longitudinal body axis (X) of the body than the leading edge, wherein upon pivoting the air conduction element from the inoperative position to the at least one final operating position, the leading edge moves closer to the body while the trailing edge moves further from the body.

* * * * *